(12) United States Patent
Ansari et al.

(10) Patent No.: US 7,969,881 B2
(45) Date of Patent: Jun. 28, 2011

(54) PROVIDING PROPORTIONALLY FAIR BANDWIDTH ALLOCATION IN COMMUNICATION SYSTEMS

(75) Inventors: Nirwan Ansari, Montville, NJ (US); Gang Cheng, Somerset, NJ (US); Kai Xu, Basking Ridge, NJ (US)

(73) Assignee: New Jersey Institute of Technology NJ (US)

( * ) Notice: Subject to any disclaimer, the term of this patent is extended or adjusted under 35 U.S.C. 154(b) by 817 days.

(21) Appl. No.: 11/563,740

(22) Filed: Nov. 28, 2006

(65) Prior Publication Data
US 2007/0121505 A1 May 31, 2007

Related U.S. Application Data

(60) Provisional application No. 60/740,020, filed on Nov. 28, 2005.

(51) Int. Cl.
*H04L 12/26* (2006.01)

(52) U.S. Cl. ......... 370/232; 370/231; 370/253; 370/235

(58) Field of Classification Search ............... 370/230; 379/112.05
See application file for complete search history.

(56) References Cited

U.S. PATENT DOCUMENTS

| | | | | |
|---|---|---|---|---|
| 5,727,051 | A * | 3/1998 | Holender | 379/112.05 |
| 6,343,065 | B1 * | 1/2002 | Serbest et al. | 370/230 |
| 6,687,247 | B1 * | 2/2004 | Wilford et al. | 370/392 |
| 7,088,678 | B1 * | 8/2006 | Freed et al. | 370/230 |
| 7,522,604 | B2 * | 4/2009 | Hussain et al. | 370/392 |
| 7,630,306 | B2 * | 12/2009 | Chuang | 370/229 |
| 7,809,009 | B2 * | 10/2010 | Tatar et al. | 370/419 |
| 2004/0062259 | A1 * | 4/2004 | Jeffries et al. | 370/412 |
| 2006/0045009 | A1 * | 3/2006 | Madison et al. | 370/229 |
| 2009/0292575 | A1 * | 11/2009 | Ellebracht et al. | 705/8 |

* cited by examiner

*Primary Examiner* — Thai D Hoang
(74) *Attorney, Agent, or Firm* — Connolly Bove Lodge & Hutz LLP

(57) ABSTRACT

Sharing a resource may include the use of label values associated with information units presented to the resource. The label values may be determined based on, for example, arrival rates and/or committed flow rates. Criteria may be applied to label values to determine if the associated information units may be dropped.

32 Claims, 5 Drawing Sheets

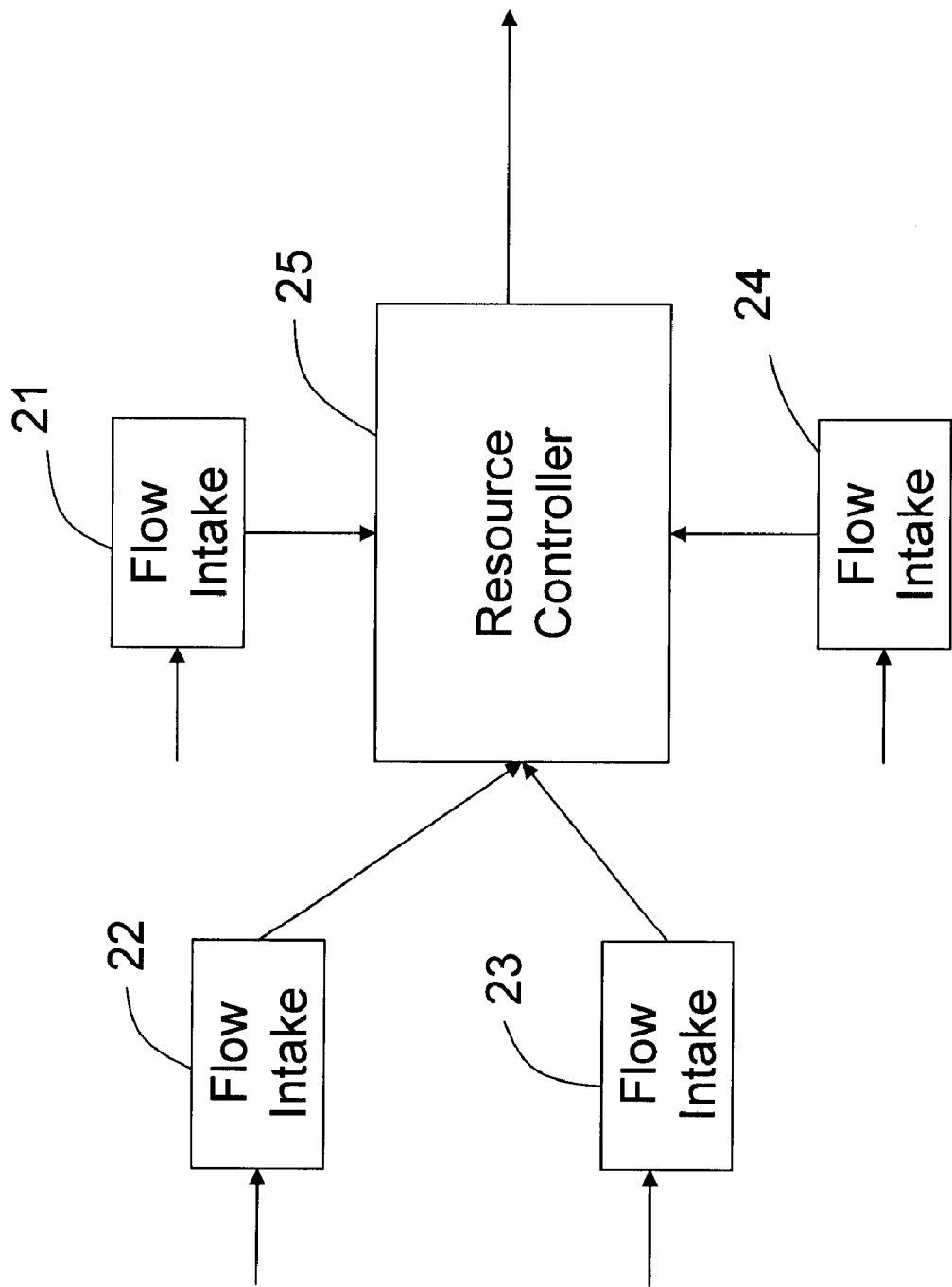

PROVIDING PROPORTIONALLY FAIR BANDWIDTH ALLOCATION IN COMMUNICATION SYSTEMS

CROSS-REFERENCE TO RELATED APPLICATION

This application claims the benefit of the filing date of U.S. Provisional Patent Application No. 60/740,020, filed Nov. 28, 2005, which is incorporated by reference herein in its entirety.

FIELD OF THE INVENTION

Embodiments of the present invention may relate to the queuing and/or sharing of communications link capacity among several competing internet links, communication paths, and/or flows (collectively, "flows"). Some embodiments may more particularly relate to the method of sharing communications capacity of a shared communications link when the sum of the communications capacities desired by the competing flows exceeds the communications capacity available, allocated, and/or provisioned for the shared communications link.

BACKGROUND OF THE INVENTION

Data links in a communication network may generally support the transport of data from many simultaneous active flows. Each flow may, for example, correspond to a communications link from one internet protocol ("IP") address to another IP address; however, this is not the only possible scenario (for example, traffic flows may also correspond to different types of data traffic, such as voice, data, video, etc., or classes of traffic having different priorities or quality of service (QoS); the invention is not limited to these examples). The traffic flows are generally not continuous; rather, they are generally bursty in nature. In many networks, multiple flows may seek to utilize a common communication resource; one example, to which the invention is not limited, is the case of multiple links to a routing node in a network.

Communication traffic is often furnished in a packetized fashion. The packetized nature of the data traffic often makes it simpler for a link capacity resource to be shared among several competing flows. Queues within routers may be used to buffer the incoming bursty flows. The shared link capacity resource may be managed by end-to-end congestion control and/or active queue management at network routers.

In many networks, a particular flow may have a committed information rate at which packet delivery is guaranteed (note that, while the discussion in this application is directed to packets and packetized information, the discussion is generally applicable to any information units (e.g., bytes, words, etc.)). If a flow transmits data faster than its committed information rate, the network may make an effort to accommodate this offending flow on a best effort basis, but may drop packets if the aggregate data rate from all the flows produces congestion (i.e., if the aggregate data rate exceeds capacity).

Various methods have been developed to select which packets to drop in order to eliminate congestion. Fair methods will assign drop probabilities to packets based on how much, if any, their incoming arrival rate exceeds their committed information rate.

Active queue management schemes for fair bandwidth allocation can be classified into two distinct categories, the core-stateful approach and core-stateless approach. The core-stateful approach requires the system associated with the shared resource (for example, but not limited to, a core router) to maintain per-flow state information, and is thus difficult to scale because of the large number of flows that may be present. In contrast, in the core-stateless queue management approach, the system does not need to maintain per-flow state information. Instead, per-flow information may be encoded in packet headers by other elements (for example, but not limited to, edge routers).

One idea used in some examples of core-stateless fair queuing (CSFQ) is to keep per-flow states at less-aggregated edge routers and to carry that information in packets to the core. Specifically, edge routers may measure or estimate each flow's arrival rate and label the packets of a flow with a corresponding arrival rate of the flow. Core routers may then estimate the flow fair share and probabilistically drop packets with labels (corresponding to arrival rates) larger than their estimated fair shares of the bandwidth. However, this requires that the core routers compute and maintain estimates of flow fair shares.

In a particular example, "differentiated services," or DiffServ, is a recent proposal to provisioning QoS for IP networks, particularly, the Internet. Related to the DiffServ proposal is a desire to provide a means of offering a spectrum of services in the Internet without the need for per-flow state and signaling in every router. DiffServ differentiates its service priorities by classifying flows into the Expedited Forwarding (EF), the Assured Forwarding (AF), and the best effort forwarding classes through service contracts. In the past, multiple random early drop (MRED) is recommended for the management of queues that handle AF traffic. Although MRED may stabilize the router queue, and may eliminate network synchronization by randomization, MRED cannot provide fair bandwidth allocation among flows.

SUMMARY OF THE INVENTION

Embodiments of the present invention may be directed to a core-stateless proportional fair queuing (CSPFQ) method for managing communications traffic in networks having committed rates, service level agreements, or similar quality of service guarantees. The AF traffic in DiffServ networks is an example to which various embodiments of the invention may be applied.

The invention may be embodied in various forms, including hardware, software, and/or firmware, and it may be embodied in the form of systems thereof. The invention may also be embodied in the form of a method.

BRIEF DESCRIPTION OF THE DRAWINGS

To assist those of ordinary skill in the relevant art in making and using the subject matter hereof, reference is made to the appended drawings, wherein:

FIGS. 2A and 2B are further conceptual block diagrams of exemplary networks in which embodiments of the invention may be employed;

DETAILED DESCRIPTION OF EMBODIMENTS OF THE INVENTION

Figure 1:
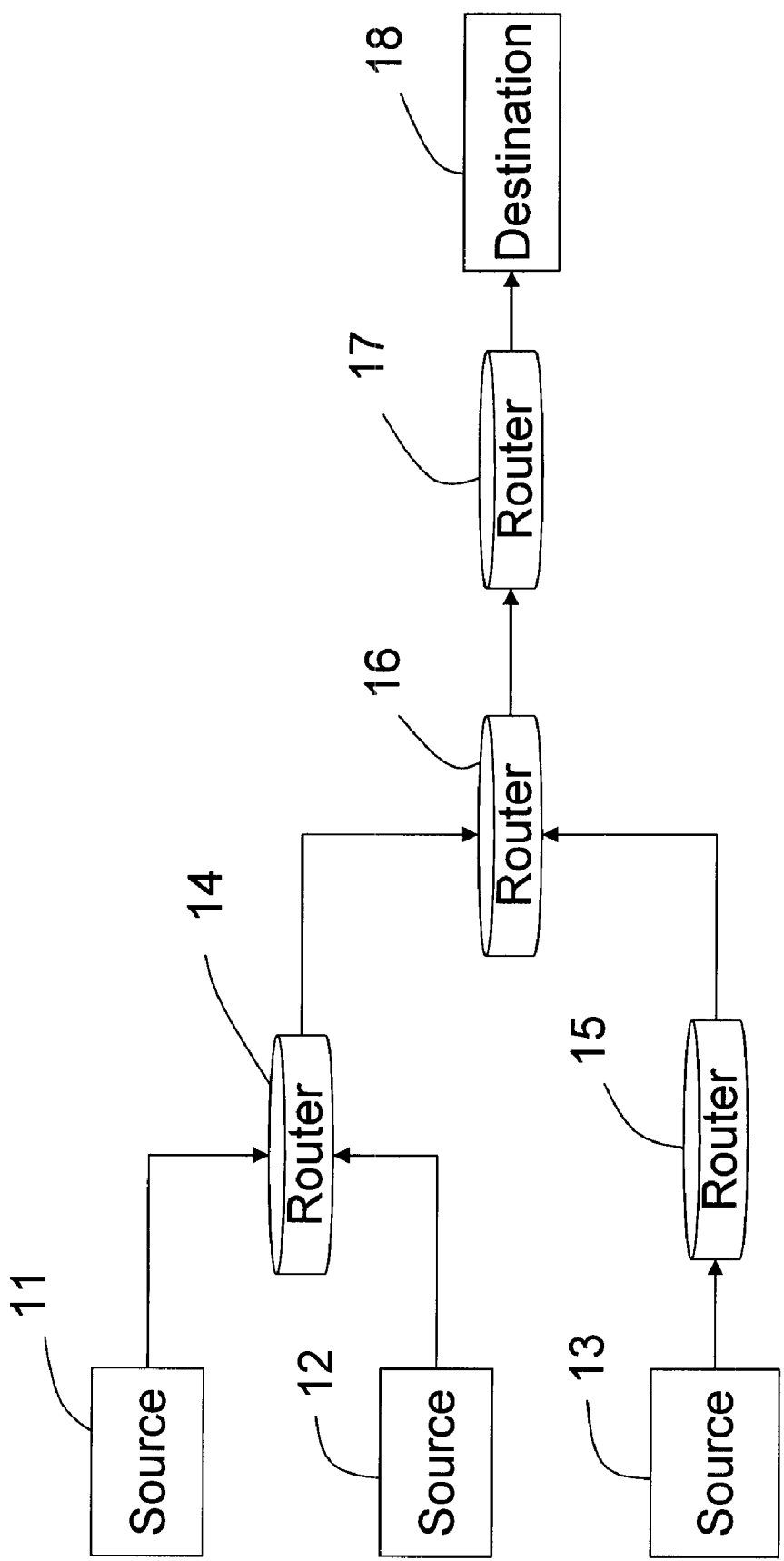
FIG. 1 is a conceptual block diagram of an exemplary network to which embodiments of the invention may be applied.

FIG. 1 shows a conceptual diagram of an exemplary communication network topology in which various embodiments of the invention may be implemented. FIG. 1 includes data sources 11-13, routers 14-17, and a destination 18. That is, in this simplified example, there are multiple sources 11-13 generating traffic destined for a single destination 18 via a network that includes routers 14-17. Routers 14 and 15 are located more peripherally in the network and may, as shown, receive direct traffic input from sources 11-13; such routers may be termed "edge routers." Routers 16 and 17, through which, in this simple example, to which the invention is not limited, all traffic from sources 11-13 must travel to get to destination 18, and which are within the interior of the network (i.e., not connected to any sources), may be termed "core routers." It is noted that any or all of routers 14-17 may be implemented in the form of specialized or general-purpose processors or computer systems running appropriate software.

Figure 2B:
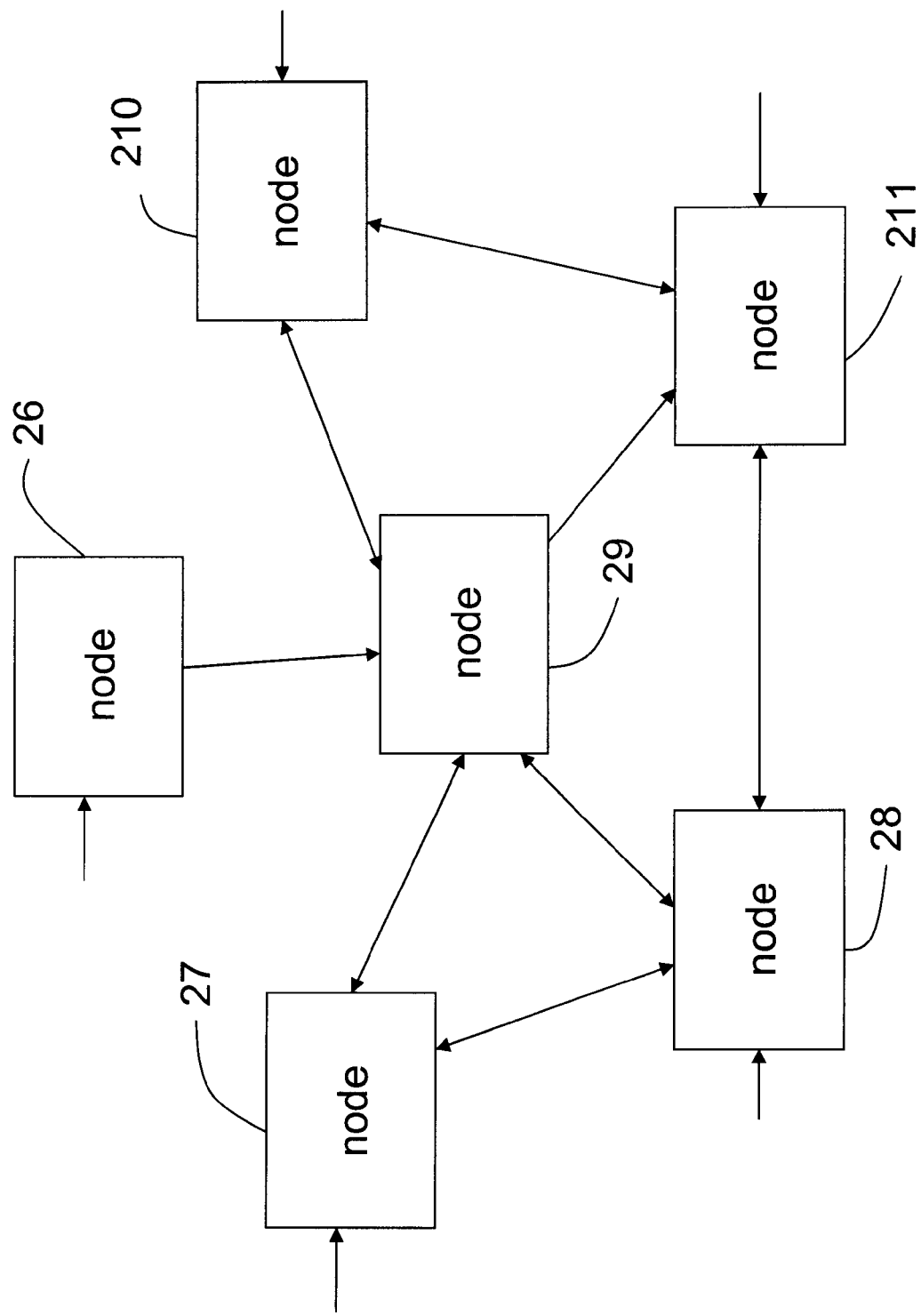

As noted above, FIG. 1 is merely an exemplary scenario in which to consider various embodiments of the invention. FIGS. 2A and 2B present more general network-based embodiments. As shown in FIG. 2A, there may be flow intake nodes 21-24 and a resource controller 25. The flow intake nodes may correspond to edge routers, and the resource controller 25 may correspond to a core router; however, the invention is not thus limited. In an alternative exemplary interpretation of FIG. 2A, components 21-25 may be collocated, so that there may be a single device into which all of the sources (not shown, but incoming traffic indicated by arrows) may send their traffic, but the device may include multiple interface sub-devices, each of which may interface with one or more of the sources. FIG. 2B shows a generalization of this concept in which nodes 26-29, 210, and 211 may act in various capacities within the network of nodes; that is, each node may act as if it is either or both of an edge router or a core router, depending on the offered traffic, the node's placement in the network, etc.

Returning to the example of FIG. 1, sources 11-13 may provide traffic to the network of FIG. 1. Furthermore, for purposes of disclosure of embodiments of the invention, to which the invention is not necessarily limited, each source may be considered as generating a distinct type of traffic, the ith source having its own arrival rate $\alpha_i$ and an committed rate, $r_i$, for its traffic flow. This committed rate may correspond to a traffic flow rate through the network.

For the purposes of this discussion, a network will be considered to be overloaded if there exists a link (or more generally, resource; while this discussion will use the term, "link," it should be understood that this discussion applies generally to network resources) for which the sum of the committed rates of flows sharing the link is larger than the link capacity. A network will be considered well-loaded if the sum of committed rates of flows, for any link in the network, is equal to the link capacity. A network will be otherwise be considered to be underloaded. Many networks, for example, DiffServ networks, offer committed rates to customers, and thus, such networks should normally be either well-loaded or underloaded.

Embodiments of the present invention may be based on a fluid model of the communications traffic flow, extended to packet communications. A single first-in, first-out queue ("FIFO") at a core router (e.g., router 16 of FIG. 1) may be shared by many flows belonging to the same traffic class (e.g., an AF traffic class of a DiffServ network), each of which may be assigned its own committed rate.

In one embodiment of the current invention, the disclosed method is a simple core-stateless proportional fair queuing utilizing an algorithm that is based on a fluid model analysis. In a typical DiffServ network, a single FIFO queue at a core router may be shared by many flows belonging to the same AF traffic class, each of which is assigned its own committed rate (note, again, that this discussion is using the terminology of a DiffServ network; however, this is merely an example, to which the invention is not intended to be limited). The core router may distribute its output bandwidth fairly among the flows and at the same time may attempt to guarantee their committed rates or other QoS parameter(s) defined by a service level agreement.

In the present embodiment which is being described in the context of assured forwarding in DiffServ networks, fairness may be defined as follows. Suppose that a core router allocates to a given flow a share of any excess bandwidth in proportion to the flow's assigned committed rate. In particular, assume n AF flows are contending for an output link of bandwidth C at the core router. The committed rate, arrival rate, and allocated bandwidth of the ith flow are denoted, respectively, $r_i$, $\alpha_i$, and $\phi_i$. In a well-loaded or under-loaded network, $r_1 + r_2 + \ldots + r_n \leq C$. It can be shown that the bandwidth allocation is fair if the following condition is met:

$$\varphi_i = \begin{cases} \min(\alpha_i, \lambda r_i), & \text{if } \sum_{i=1}^{n} \alpha_i > C; \\ \alpha_i, & \text{if } \sum_{i=1}^{n} \alpha_i \leq C, \end{cases} \quad (1)$$

where $i = 1, 2, \ldots, n$, and where and $\lambda$ satisfies $$\sum_{i=1}^{n} \min(\alpha_i, \lambda r_i) = C. \quad (2)$$

In embodiments of the invention, each information unit (e.g., packet) may be encoded with a label $l_i$ defined as follows:

$$l_i = \frac{\max(\pi \alpha_i - r_i, 0)}{r_i}, \quad (3)$$

where $\pi$ is a uniform random variable distributed on [0,1]. Each flow may then achieve its fair share rate if the information units with labels larger than $\pi - 1$ are dropped, when there is a congested link, i.e., when $$\sum_{i=1}^{n} \alpha_i > C.$$

Figure 3:
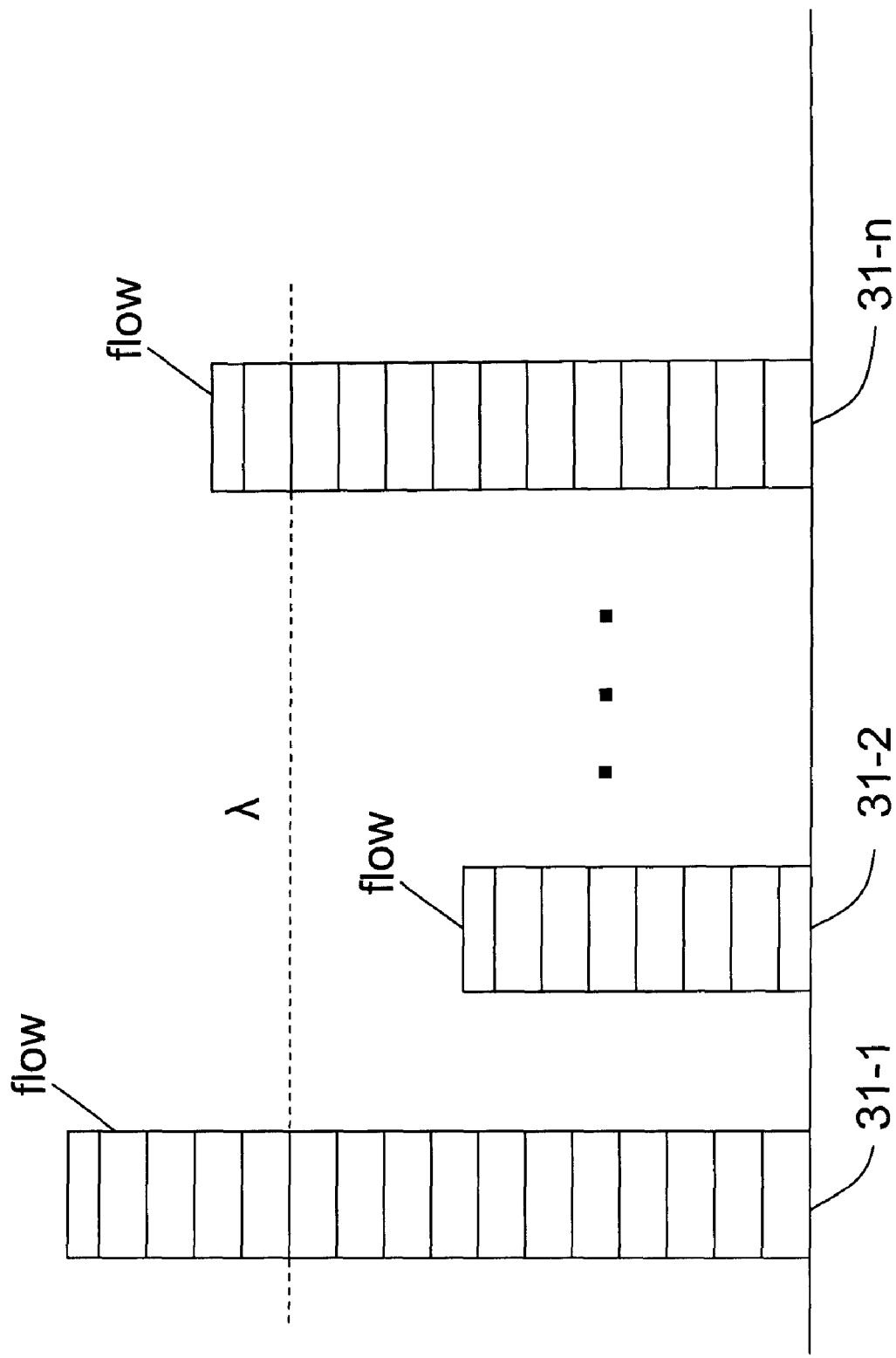
FIG. 3 is a conceptual illustration of information units of multiple flows sorted by their labels.

However, as illustrated in FIG. 3, there is an alternative way to achieve fairness. When congestion occurs, one may fairly allocate bandwidth among flows by iteratively dropping the bits with the largest labels until the rate of aggregated traffic is decreased to the bandwidth of the output link, by which each flow can also achieve its fair share. Note that labels only depend on the committed rates and the arrival rates. Note that these may be measured or estimated, for example, by edge routers or other network elements. Hence, a fluid model-based CSPFQ queue management algorithm may be implemented as follows:

1. Each information unit of a flow may be assigned a label, $$l = \frac{\max(\pi \alpha - r, 0)}{r}.$$

This may, for example, be done by edge routers (such as routers 14 and 15 of FIG. 1), where r is the committed rate of the corresponding flow, α is its arrival rate, as measured or estimated, and π is a random variable uniformly distributed in [0,1].

2. At the resource controller (such as one of the core routers 16 and 17 of FIG. 1 or the resource controller 25 of FIG. 2), when congestion occurs, bits with the largest labels may be iteratively dropped until the arrival rate of the aggregated traffic is decreased to the resource's capacity (e.g., in the case of router, the router's output rate).

In an alternative embodiment, edge routers may, once again, label the information units of a flow based on the flow's arrival rate and committed rate. As noted above, in practice, flow arrival rates may not be known to the edge routers, but may be estimated by the edge routers. For example, one way of doing this may be to use an exponentially weighted moving average to estimate the flow arrival rates; such an approach has been presented in I. Stoicka et al., "Core-Stateless Fair Queueing: A Scalable Architecture to Approximate Fair Bandwidth Allocations in High-Speed Networks," *IEEE/ACM Transactions on Networking*, Vol. 11, No. 1, pp. 33-46, 2003. However, the invention is not limited to this specific estimation technique, and other estimation and/or measurement techniques may be used.

In this embodiment, the queue management algorithm may be described as follows:
1. Each information unit of a flow may be assigned a label, $$l = \frac{\max(\pi\alpha - r, 0)}{r}.$$

This may, for example, be done by edge routers (such as routers 14 and 15 of FIG. 1), where r is the committed rate of the corresponding flow, α is its arrival rate, as measured or estimated, and π is a random variable uniformly distributed in [0,1]. If the arrival rate is being estimated, each time an information unit arrives, the arrival rate may be updated, according to some estimation algorithms.

2. Each resource controller, such as a core router, may maintain a threshold and may drop the information units whose labels exceed the threshold. The threshold may be a function of the current queue size associated with the resource (e.g., communications link) and the sum of the committed rates of all flows sharing the queue. Specifically, a packet with label l>0 may be dropped if:

$$\sigma s l + q_{current} > \rho q_{max},$$

and $$q_{current} > \beta q_{max}, \quad (4)$$

where σ, β, and ρ are constants, s is the sum of the committed rates of flows sharing the queue, $q_{current}$ is the current queue size, and $q_{max}$ is the maximum queue size. Note that, according to the conditions found in (4), information units may only be dropped when the current queue size is larger than a threshold ($\beta q_{max}$); otherwise, information units in the queue may be easily drained before the new information units arrive, and the network throughput is not unnecessarily decreased.

In practice, the constants σ, β, and ρ may be determined according to user preferences. In an exemplary implementation of this embodiment, β was set to 0.2. σ may, for example, be set to an average round trip time of flows because it takes about a round trip time for a responsive flow, such as a TCP flow, to throttle its sending rate upon a packet loss. ρ may be related to specific network characteristics. For example, in some networks, traffic distortion may be high; even a flow containing information units all with small labels may still be very bursty. Hence, in order to guarantee the committed rates of flows or other QoS as defined by a service level agreement, one may reserve a portion of the queue to accommodate information units with label 0 so that such information units are never dropped except when the queue is full. It is further noted that ρ is also significant in influencing the average queue size.

Some additional embodiments of the present invention include a variety of applications for the method. These include by way of example, only, with no intention to limit possible application, network services in which delivery of the digitized packet data is governed by a service level agreement or other QoS agreement, in which latency, probability of delivery, or other user-observable technical details of the flow quality may be specified. For instance, low latency may be important to digitized voice or video transmission, where random delays in packet delivery may result in unpleasant user-perceptible delays, periods of speech silence, frozen video displays, etc. High probability of delivery, or conversely, low probability of lost packets, may be important for data file delivery, where lost packets may cause retransmission requests within the network, thereby wasting network resources and delaying delivery of the file.

Figure 4:
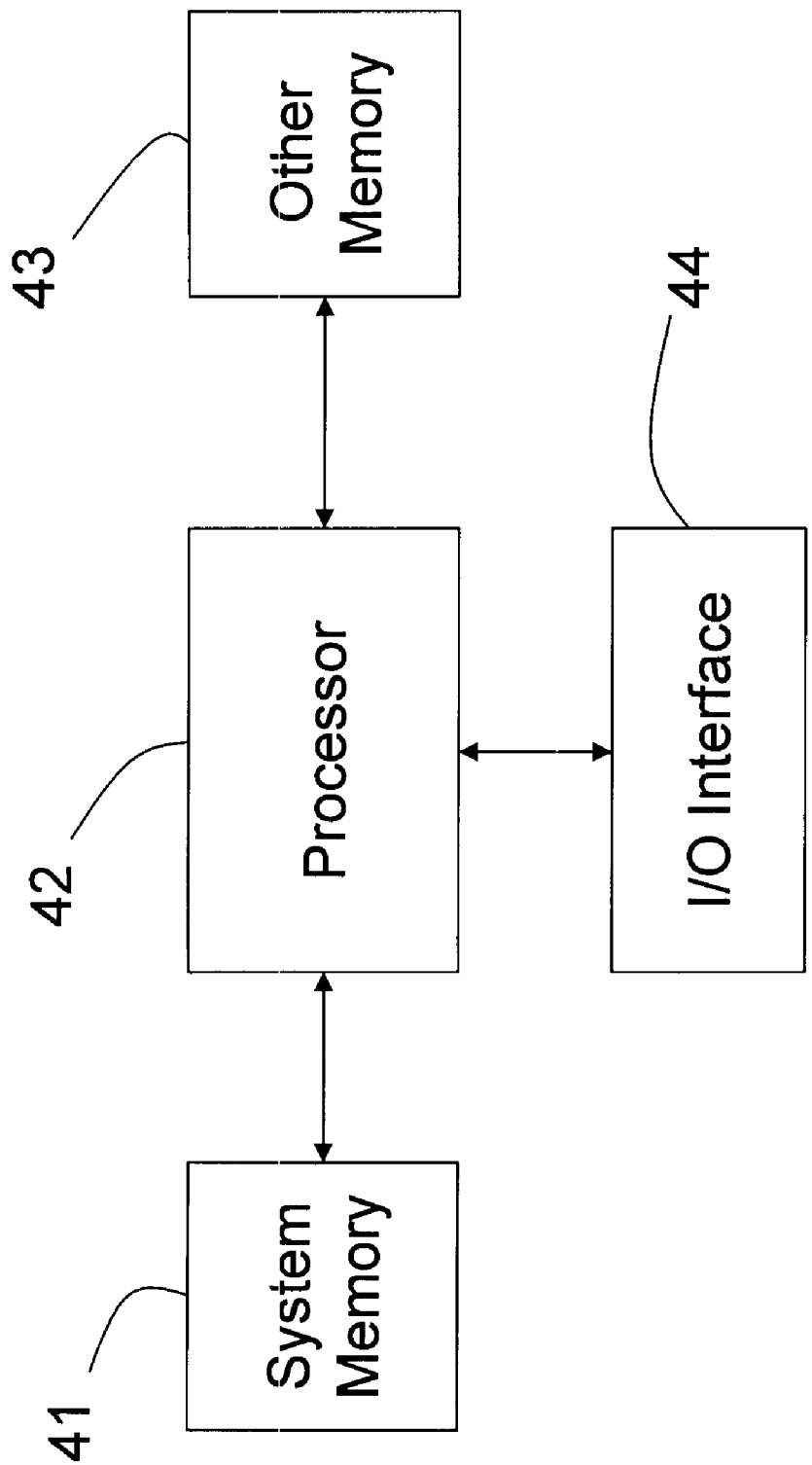
FIG. 4 is a conceptual block diagram of an exemplary computer system in which embodiments of the invention may be fully or partially implemented.

Various embodiments of the invention may comprise hardware, software, and/or firmware. FIG. 4 shows an exemplary system that may be used to implement various forms and/or portions of embodiments of the invention. Such a computing system may include one or more processors 42, which may be coupled to one or more system memories 41. Such system memory 41 may include, for example, RAM, ROM, or other such machine-readable media, and system memory 41 may be used to incorporate, for example, a basic I/O system (BIOS), operating system, instructions for execution by processor 42, etc. The system may also include further memory 43, such as additional RAM, ROM, hard disk drives, or other processor-readable media. Processor 42 may also be coupled to at least one input/output (I/O) interface 44. I/O interface 44 may include one or more user interfaces, as well as readers for various types of storage media and/or connections to one or more communication networks (e.g., communication interfaces and/or modems), from which, for example, software code may be obtained. Such a computing system may, for example, be used as a platform on which to run translation software and/or to control, house, or interface with an emulation system. Furthermore, other devices/media may also be coupled to and/or interact with the system shown in FIG. 4.

Applicant has attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

We claim:
1. A method of allocating a shared resource among multiple traffic flows sharing the resource, the method comprising:
receiving information units at a resource controller, each having an associated value, wherein the value associated with a particular information unit is a function of an arrival rate and a committed rate associated with a traffic flow with which the particular information unit is associated; and determining, by the resource controller, an information unit to be dropped from the flow, wherein the determined information unit has an associated value exceeding a threshold and, wherein the threshold is a function of a current size of a queue associated with the shared resource, a maximum size of the queue, and a sum of committed rates for the traffic flows sharing the resource.

2. The method according to claim 1, wherein at least one arrival rate is estimated using an exponentially-weighted moving average.

3. The method according to claim 1, wherein the shared resource comprises a communications link.

4. The method according to claim 1, wherein the function comprises a random function of the arrival rate.

5. The method according to claim 4, wherein the random function comprises a product of a uniformly-distributed random variable with the arrival rate.

6. A method of allocating a shared resource among multiple traffic flows sharing the resource, the method comprising:

receiving information units at a resource controller, each having an associated value, wherein the value associated with a particular information unit is a function of an arrival rate and a committed rate associated with a traffic flow with which the particular information unit is associated; and in response to congestion occurring in the shared resource, determining one or more information units having largest associated values to be dropped from the flow until an aggregate arrival rate to the shared resource is reduced to or below a maximum capacity of the shared resource, wherein the maximum capacity is determined partially based on at least one queue parameter and at least one committed rate.

7. The method according to claim 6, wherein at least one arrival rate is estimated using an exponentially-weighted moving average.

8. The method according to claim 6, wherein the shared resource comprises a communications link.

9. The method according to claim 6, wherein the function comprises a random function of the arrival rate.

10. The method according to claim 9, wherein the random function comprises a product of a uniformly-distributed random variable with the arrival rate.

11. A computer-readable medium having stored thereon, computer executable instructions comprising:

instructions for receiving information units, each having an associated value, wherein the value associated with a particular information unit is a function of an arrival rate and a committed rate associated with a traffic flow with which the particular information unit is associated; and instructions for determining an information unit to be dropped from the flow whose associated value exceeds a threshold, wherein the threshold is a function of a current size of a queue associated with the shared resource, a maximum size of the queue, and a sum of committed rates for the traffic flows sharing the resource.

12. The medium according to claim 11, wherein at least one arrival rate is estimated using an exponentially-weighted moving average.

13. The medium according to claim 11, wherein the shared resource comprises a communications link.

14. The medium according to claim 11, wherein the function comprises a random function of the arrival rate.

15. The medium according to claim 14, wherein the random function comprises a product of a uniformly-distributed random variable with the arrival rate.

16. A computer-readable medium having stored thereon, computer executable instructions comprising:

instructions for receiving information units, each having an associated value, wherein the value associated with a particular information unit is a function of an arrival rate and a committed rate associated with a traffic flow with which the particular information unit is associated; and instructions for, in response to congestion occurring in the shared resource, determining one or more information units to be dropped from the flow and having largest associated values until an aggregate arrival rate to the shared resource is reduced to or below a maximum capacity of the shared resource, wherein the maximum capacity is determined partially based on at least one queue parameter and at least one committed rate.

17. The medium according to claim 16, wherein at least one arrival rate is estimated using an exponentially-weighted moving average.

18. The medium according to claim 16, wherein the shared resource comprises a communications link.

19. The medium according to claim 16, wherein the function comprises a random function of the arrival rate.

20. The medium according to claim 19, wherein the random function comprises a product of a uniformly-distributed random variable with the arrival rate.

21. A communication apparatus comprising:

at least one communication network element to be shared among multiple traffic flows, the network element to:

receive information units, each having an associated value, wherein the value associated with a particular information unit is a function of an arrival rate and a committed rate associated with a traffic flow with which the particular information unit is associated; and determine an information unit whose associated value exceeds a threshold to be dropped from the flows, wherein the threshold is a function of a current size of a queue associated with the network element, a maximum size of the queue, and a sum of committed rates for the traffic flows among which the network element is to be shared.

22. The communication apparatus according to claim 21, wherein the network element is associated with a communications link in a communication network.

23. The communication apparatus according to claim 21, further comprising:

an interface element associated with at least one of the traffic flows, the interface element to provide the associated values to the information units.

24. The communication apparatus according to claim 23, wherein the interface element is further to estimate an arrival rate associated with each traffic flow with which the interface element is associated.

25. The communication apparatus according to claim 21, wherein the function comprises a random function of the arrival rate.

26. The communication apparatus according to claim 25, wherein the random function comprises a product of a uniformly-distributed random variable with the arrival rate.

27. A communication apparatus comprising:
  at least one communication network element to be shared among multiple traffic flows, the network element to:
  receive information units, each having an associated value, wherein the value associated with a particular information unit is a function of an arrival rate and a committed rate associated with a traffic flow with which the particular information unit is associated; and
  in response to congestion occurring in the network element, determine one or more information units having largest associated values to be dropped from the flow until an aggregate arrival rate to the network element is reduced to or below a maximum capacity of the network element at least partially dependent upon at least one queue parameter and at least one committed rate.

28. The communication apparatus according to claim 27, wherein the network element is associated with a communications link in a communication network.

29. The communication apparatus according to claim 27, further comprising:
  an interface element associated with at least one of the traffic flows, the interface element to provide the associated values to the information units.

30. The communication apparatus according to claim 29, wherein the interface element is further to estimate an arrival rate associated with each traffic flow with which the interface element is associated.

31. The communication apparatus according to claim 27, wherein the function comprises a random function of the arrival rate.

32. The communication apparatus according to claim 31, wherein the random function comprises a product of a uniformly-distributed random variable with the arrival rate.

* * * * *